United States Patent
Bahirat

(10) Patent No.: US 7,023,646 B2
(45) Date of Patent: Apr. 4, 2006

(54) EFFICIENT NOTCH COEFFICIENT COMPUTATION FOR A DISC DRIVE CONTROL SYSTEM USING FIXED POINT MATH

(75) Inventor: Shirish Dnyaneshware Bahirat, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 215 days.

(21) Appl. No.: 10/657,465

(22) Filed: Sep. 8, 2003

(65) Prior Publication Data

US 2005/0052774 A1   Mar. 10, 2005

(51) Int. Cl.
*G11B 21/02*   (2006.01)

(52) U.S. Cl. .................................................. 360/75

(58) Field of Classification Search ................ 360/75; 381/71.11, 98; 708/320
See application file for complete search history.

(56) References Cited

U.S. PATENT DOCUMENTS

| | | | |
|---|---|---|---|
| 5,325,247 A | | 6/1994 | Ehrlich et al. |
| 5,867,342 A | | 2/1999 | Hattori |
| 5,910,994 A | * | 6/1999 | Lane et al. ................ 381/93 |
| 6,122,125 A | | 9/2000 | Clare et al. |
| 6,144,181 A | | 11/2000 | Rehm et al. |
| 6,188,191 B1 | | 2/2001 | Frees et al. |
| 6,246,536 B1 | | 6/2001 | Galloway |
| 6,256,163 B1 | | 7/2001 | Schmidt et al. |
| 6,414,812 B1 | | 7/2002 | Hattori |
| 6,469,467 B1 | | 10/2002 | Fujita |
| 6,611,602 B1 | * | 8/2003 | White et al. .............. 381/98 |
| 6,819,521 B1 | | 11/2004 | Ho et al. |

* cited by examiner

*Primary Examiner*—David Hudspeth
*Assistant Examiner*—Mitchell Slavitt
(74) *Attorney, Agent, or Firm*—David K. Lucente; Derek J. Berger

(57) ABSTRACT

A method and apparatus for efficiently calculating notch filter coefficients for a disc drive actuator arm control system is disclosed. In a preferred embodiment, filter coefficients for a z-domain notch-filter transfer function are calculated in fixed-point arithmetic from polynomial interpolations of the non-linear functions that define the coefficients in terms of the notch frequency. These non-linear functions may be derived and interpolated a priori by applying the bilinear transform to an s-domain notch transfer function. Since, in a preferred embodiment, the z-domain transfer function can be expressed as a fraction, the numerator and denominator of the transfer function can be scaled so as to allow the coefficients to be expressed as integers, thus making it possible to calculate the filter coefficients from the aforementioned polynomial interpolations using fixed-point math.

26 Claims, 2 Drawing Sheets

EFFICIENT NOTCH COEFFICIENT COMPUTATION FOR A DISC DRIVE CONTROL SYSTEM USING FIXED POINT MATH

FIELD OF THE INVENTION

The present invention relates generally to the use of notch filters in digital control systems of disc drives. In particular, the present invention provides a method and apparatus for efficiently calculating notch filter coefficients to compensate for the resonant frequencies of a particular disc drive.

BACKGROUND OF THE INVENTION

Modern disc drive designs use digital feedback control systems to control the position of the head with respect to the tracks on the recording surface of the disc. Because disc drives and their electrical control systems, like all complex physical systems, are susceptible to resonance at particular frequencies, the feedback control system that is used to control the movement of the actuator arm generally employs one or more digital notch filters at some point in the feedback loop. These digital notch filters must be calibrated to attenuate the particular resonant frequencies of the particular disc drive in which the filters are used. In other words, a set of constant coefficients for each digital notch filter must be determined so that the filter attenuates an actual resonant frequency of the disc drive.

Since the resonant frequencies of disc drive may vary from drive to drive, it is not sufficient to find a single set of coefficients for a given design. Rather, each disc drive must be individually calibrated. At present, this calibration process generally takes place at the time of media certification, which is when the manufacturer uses the assembled drive to scan the recording media for defects and marks defective disc sectors as unusable. Manufacturers run a series of tests to determine the resonant frequencies of the drive. The disc drive, in turn, uses these resonant frequencies to look up filter coefficients in a table of coefficient values for various frequencies and programs its notch filters using the coefficients retrieved from the table.

Table lookup, however, requires that all coefficient values be stored in memory. This makes it more complicated and costly to obtain precise filter coefficient values for a given design, since finer levels of precision require more firmware memory to store more filter coefficient values. What is needed, then, is a way to achieve precise filter calibration while minimizing memory usage. The present invention provides a solution to this and other problems, and offers other advantages over previous solutions.

SUMMARY OF THE INVENTION

The present invention provides a method and apparatus for efficiently calculating notch filter coefficients for a disc drive actuator arm control system. In a preferred embodiment, filter coefficients for a z-domain notch-filter transfer function are calculated in fixed-point arithmetic from polynomial interpolations of the non-linear functions that define the coefficients in terms of the notch frequency. These non-linear functions may be derived and interpolated a priori by applying the bilinear transform to an s-domain notch transfer function. Since, in a preferred embodiment, the z-domain transfer function can be expressed as a fraction, the numerator and denominator of the transfer function can be scaled so as to allow the coefficients to be expressed as integers, thus making it possible to calculate the filter coefficients from the aforementioned polynomial interpolations using fixed-point math.

DETAILED DESCRIPTION

Figure 1:
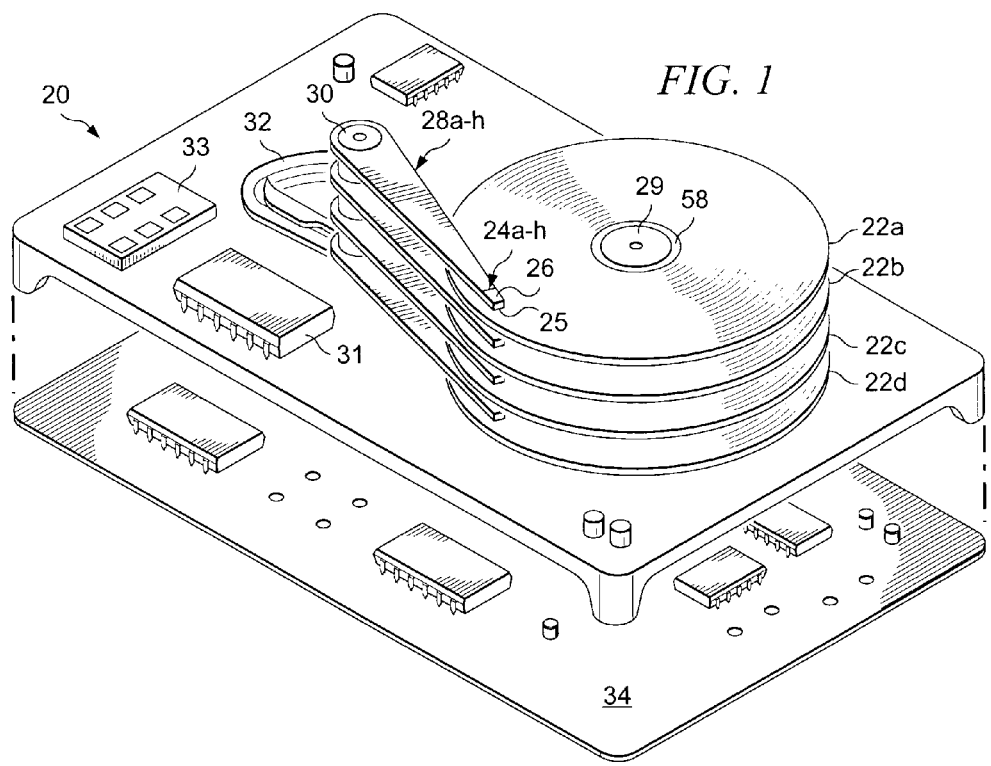
FIG. 1 is an exemplary perspective view of an exemplary disc drive.

Referring now to the drawings, and initially to FIG. 1, there is illustrated an example of a disc drive designated generally by reference numeral 20. Disc drive 20 includes a stack of storage discs 22*a–d* and a stack of read/write heads 24*a–h*. Each of storage discs 22*a–d* is provided with a plurality of data tracks to store user data. As illustrated in FIG. 1, one head is provided for each surface of each of storage discs 22*a–d* such that data can be read from or written to the data tracks of all of the storage discs. The heads are coupled to pre-amplifier 31. It should be understood that disc drive 20 is merely representative of a disc drive system utilizing the present invention and that the present invention can be implemented in a disc drive system including more or less storage discs.

Storage discs 22*a–d* are mounted for rotation by spindle motor arrangement 29, as is known in the art. Moreover, read/write heads 24*a–h* are supported by respective actuator arms 28*a–h* for controlled positioning over preselected radii of storage discs 22*a–d* to enable the reading and writing of data from and to the data tracks. To that end, actuator arms 28*a–h* are rotatably mounted on pin 30 by voice coil motor 32 operable to controllably rotate actuator arms 28*a–h* radially across the disc surfaces.

Each of read/write heads 24*a–h* is mounted to a respective one of actuator arm 28*a–h* by a flexure element (not shown) and comprises a magnetic transducer 25 mounted to slider 26 having an air bearing surface (not shown), all in a known manner. As typically utilized in disc drive systems, sliders 26 cause magnetic transducers 25 of the read/write heads 24*a–h* to "fly" above the surfaces of the respective storage discs 22*a–d* for non-contact operation of the disc drive system, as discussed above. When not in use, voice coil motor 32 rotates actuator arms 28*a–h* during a contact stop operation, to position read/write heads 24*a–h* over a respective one of landing zones 58 or 60, where read/write heads 24*a–h* come to rest on the storage disc surfaces. As should be understood, each of read/write heads 24*a–h* is at rest on a respective one of landing zones 58 or 60 at the commencement of a contact start operation.

Printed circuit board (PCB) 34 is provided to mount control electronics for controlled operation of spindle motor 29 and voice coil motor 32. PCB 34 also includes read/write channel circuitry coupled to read/write heads 24*a–h* via pre-amplifier 31, to control the transfer of data to and from the data tracks of storage discs 22a–d. The manner for coupling PCB 34 to the various components of the disc drive is well known in the art, and includes connector 33 to couple the read/write channel circuitry to pre-amplifier 31.

Figure 2:
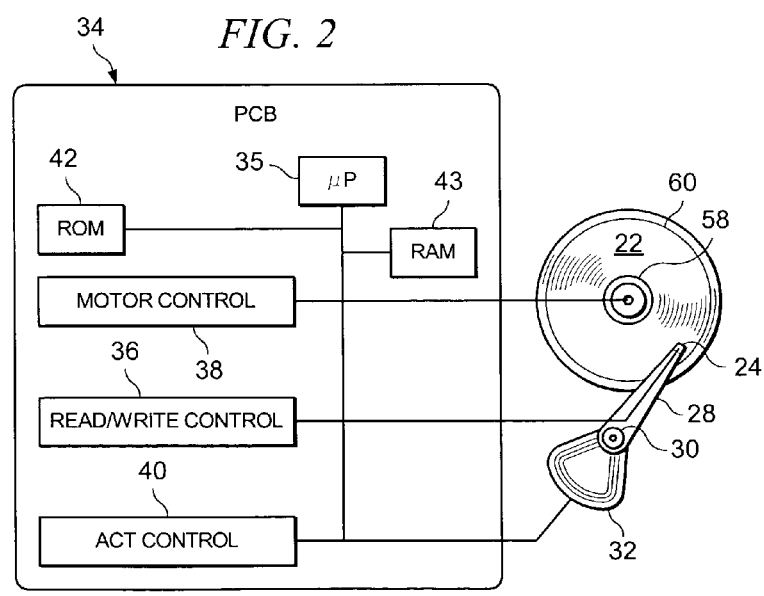
FIG. 2 is an exemplary top plan view of the printed circuit board of the exemplary disc drive of FIG. 1.

Referring now to FIG. 2, there is illustrated in schematic form PCB 34 and the electrical couplings between the control electronics on PCB 34 and the components of the disc drive system described above. Microprocessor 35 is coupled to each of read/write control 36, spindle motor control 38, actuator control 40, ROM 42 and RAM 43. In modern disc drive designs, the microprocessor can comprise a digital signal processor (DSP). Microprocessor 35 sends data to and receives data from storage discs 22a–d via read/write control 36 and read/write heads 24a–h.

Microprocessor 35 also operates according to instructions stored in ROM 42 to generate and transmit control signals to each of spindle motor control 38 and actuator control 40.

Spindle motor control 38 is responsive to the control signals received from microprocessor 35 to generate and transmit a drive voltage to spindle motor 29 to cause storage discs 22a–d to rotate at an appropriate rotational velocity.

Similarly, actuator control 40 is responsive to the control signals received from microprocessor 35 to generate and transmit a voltage to voice coil motor 32 to controllably rotate read/write heads 24a–h, via actuator arms 28a–h, to preselected radial positions over storage discs 22a–d. The magnitude and polarity of the voltage generated by actuator control 40, as a function of the microprocessor control signals, determines the radial direction and radial speed of read/write heads 24a–h.

When data to be written or read from one of storage discs 22a–d are stored on a data track different from the current radial position of read/write heads 24a–h, microprocessor 35 determines the current radial position of read/write heads 24a–h and the radial position of the data track where read/write heads 24a–h are to be relocated. Microprocessor 35 then implements a seek operation wherein the control signals generated by microprocessor 35 for actuator control 40 cause voice coil motor 32 to move read/write heads 24a–h from the current data track to a destination data track at the desired radial position.

When the actuator has moved read/write heads 24a–h to the destination data track, a multiplexer (not shown) is used to couple read/write heads 24a–h over the specific data track to be written or read, to read/write control 36, as is generally known in the art. Read/write control 36 includes a read channel that, in accordance with modern disc drive design, comprises an electronic circuit that detects information represented by magnetic transitions recorded on the disc surface within the radial extent of the selected data track. As described above, each data track is divided into a number of data sectors.

During a read operation, electrical signals transduced by the head from the magnetic transitions of the data sectors are input to the read channel of read/write control 36 for processing via pre-amplifier 31. Random access memory (RAM) 43 can be used to buffer data read from or to be written to the data sectors of storage discs 22a–d via read/write control 36. The buffered data can be transferred to or from a host computer utilizing the disc drive for data storage.

Figure 3:
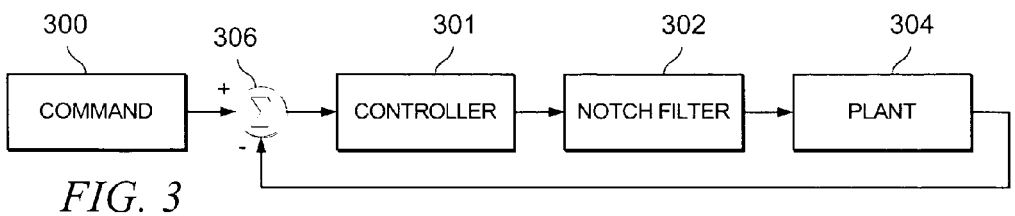
FIG. 3 is a block diagram of a control system for a disc drive in which the present invention may be utilized.

The present invention is directed toward a method and apparatus for generating notch filter coefficients for a disc drive actuator arm control system using fixed-point arithmetic. FIG. 3 is a diagram of a disc drive actuator arm control system with which a preferred embodiment of the invention may be employed.

A digital command signal 300 for seeking or track-following is provided as input to summer 306, which combines command signal 300 with feedback from plant 304, which in a preferred embodiment is voice coil motor 32 in FIG. 1. In a preferred embodiment, this feedback from plant 304 will be the position error signal (PES) of a particular disc drive head. A digital controller 301 generates a signal from the output of summer 306 that minimizes plant disturbance and maintains tracking requirements. Notch filter 302 is interposed between summer 306 and plant 304 and is used to filter out resonant frequencies from the control signal sent to plant 304, so as to prevent the control system in FIG. 3 from becoming unstable. In a preferred embodiment notch filter 302 may actually comprise a cascade of multiple filters configured to filter out a number of different resonant frequencies.

A preferred embodiment of the present invention is implemented in the form of program code that is executed by a microprocessor within the disc drive. During the manufacturer's media certification process the resonant frequencies of the disc drive are ascertained by processes that are well-known to those skilled in the art. A preferred embodiment of the present invention uses these empirical resonant frequency measurements to derive coefficients for the actuator arm control system's notch filter. Although the calculations that are performed on the measured frequencies to obtain the coefficients are performed using fixed-point arithmetic, in order to best understand the principles of operation of a preferred embodiment of the present invention, it is helpful to delve into some mathematical analysis over the complex number system.

In analog signal processing, it is well-known and customary to express the transfer functions of system components as functions in the s-domain, i.e., as Laplace transforms. For example, the transfer function of a second-order notch filter is given as:

$$T(s) = \frac{s^2 + \left(\frac{\omega_0}{Q_1}\right) + \omega_0^2}{s^2 + \left(\frac{\omega_0}{Q_2}\right) + \omega_0^2} \tag{1}$$

where $\omega_0$ is the notch frequency (expressed in radians per second) and $Q_1$ and $Q_2$ are "quality factors," which are parameters that control the depth and width of the notch (stopband), respectively. The s-domain transfer function of a system is related to the frequency response of the system by the identity $s=j\omega$, where $\omega$ is a radian frequency and $j=\sqrt{-1}$.

Since the Laplace transform is a mathematical tool to performing analysis of continuous-time systems, the Laplace transform cannot be applied to digital (i.e., discrete-time) signal processing (at least not directly). Instead, the z-transform, which can be considered the discrete-time counterpart to the Laplace transform, is used. Since disc drives are generally digitally controlled, a preferred embodiment of the present invention uses fixed point arithmetic to calculate transfer function coefficients for a digital filter specified in terms of the discrete-time z-transform.

In practice, it is customary in the design of digital filters to first start with an s-domain transfer function for the desired filtering function and transform the s-domain transfer function in to a z-domain transfer function. One commonly employed transformation technique for transforming an s-domain transfer function into a z-domain transfer function is known as the bilinear transformation (also referred to as Tustin's rule). The concepts of the s-domain, z-domain, and bilinear transformation are well-known in the digital signal processing art, so there is no need to provide an elaborate and detailed discussion of these topics. Nonetheless, a brief description of how the bilinear transformation is performed, as well as some of the notation used in describing digital and analog signal processing concepts, may be helpful to an understanding of a preferred embodiment of the present invention. The reader seeking a more detailed treatment of the topic is directed to Ashok Ambardar, *Analog and Digital Signal Processing*, PWS Publishing, 1995, or any of the many introductory textbooks in the field of digital signal processing.

A digital signal comprises a sequence of discrete values or samples, each representing a value of the signal at some point in time. A digital signal can be (and typically is) obtained from an analog signal by periodically sampling the magnitude of the analog signal over time to obtain the discrete digital signal values. The number of samples taken per second (i.e., the number of digital signal values representing a one-second interval of time) is referred to as the "sampling rate" of the digital signal, and is denoted as $S_f$. The sampling period $t_s = S_f^{-1}$ measures the amount of time between successive samples.

The concept of signal frequency is thus somewhat complicated for discrete-time signals, since there is both a sampling rate and whatever frequency components of the original sampled signal may exist. For example, a discrete-time representation of a sinusoidal function will have a signal frequency (i.e., the frequency of the sinusoid) as well as a sampling rate. The "digital frequency" $\Omega_D$ of a signal is given by $\Omega_D = \omega/t_S$, where $\omega$ is the radian signal frequency.

The bilinear transformation maps a function in the s-domain into the z-domain by performing the following substitution:

$$s \rightarrow \frac{2}{t_s}\left(\frac{z-1}{z+1}\right). \tag{2}$$

In practice, however, an enhanced form of the bilinear transformation, the bilinear transformation with prewarping, is used to reduce frequency-related distortion. Prewarping is used to match the response of the z-domain function at digital frequency $\Omega_D$ to the response of the s-domain function at radian signal frequency $\omega$. The bilinear transformation with prewarping utilizes the following substitution in place of that above:

$$s \rightarrow C\frac{z-1}{z+1}, \tag{3}$$

where C is defined as $$C = \frac{\omega_A}{\tan\left(\frac{1}{2}\Omega_D\right)}. \tag{4}$$

The bilinear transformation, therefore, allows a transfer function in the z-domain to be derived from an s-domain transfer function. It is well known in the art that transfer functions in the z-domain are readily implemented in digital circuitry. Indeed, z-domain transfer functions provide the basis for digital filters and digital signal processing in general.

The present invention is concerned with the derivation of coefficients for z-domain transfer functions used for implementing digital notch filters in disc drives. Equation 1, above, provides the s-domain transfer function of a second-order notch filter. The bilinear transformation with prewarping can be used to transform this transfer function into a z-domain transfer function, as below:

$$T(z) = \frac{\left(C\frac{z-1}{z+1}\right)^2 + \frac{\omega_0}{Q_1} + \omega_0^2}{\left(C\frac{z-1}{z+1}\right)^2 + \frac{\omega_0}{Q_2} + \omega_0^2}. \tag{5}$$

Multiplying the numerator and denominator by $Q_1Q_2(z+1)^2$, multiplying out the parentheses, and collecting like terms yields $$T(z) = \frac{a_2 z^2 + a_1 z + a_0}{b_2 z^2 + b_1 z + b_0}, \text{ where} \tag{6}$$

$$a_2 = Q_1 Q_2 C^2 + Q_2 \omega_0 + Q_1 Q_2 \omega_0^2,$$

$$a_1 = 2Q_2 \omega_0 + 2Q_1 Q_2 \omega_0^2 - 2Q_1 Q_2 C^2,$$

$$a_0 = Q_1 Q_2 C^2 + Q_1 Q_2 w_0^2 + Q_2 \omega_0,$$

$$b_2 = Q_1 Q_2 C^2 + Q_1 \omega_0 + Q_1 Q_2 \omega_0^2,$$

$$b_1 = 2Q_1 \omega_0 + 2Q_1 Q_2 \omega_0^2 - 2Q_1 Q_2 C^2,$$

$$b_0 = Q_1 Q_2 C^2 + Q_1 Q_2 w_0^2 + Q_1 \omega_0.$$

Thus, for a particular filter design, T(z) is the quotient of two polynomials in z. The particular frequency response of the filter, then, is determined by the values of the coefficients of these polynomials. Thus, a primary task of a preferred embodiment of the present invention is to derive values for these coefficients using fixed-point math.

There are two primary challenges that a preferred embodiment of the present invention overcomes in order to compute these coefficients using fixed-point math. First, since Q, C, and $\omega_0$ will generally have a significant fractional component, it is necessary to use scaling in order to allow the polynomial coefficients to be expressed as integers without losing a great deal of accuracy. Since T(z) is a fraction, Equation 6 can be scaled by simply multiplying the numerator and denominator by a constant K, where the choice of K will depend upon the general frequency range of interest (i.e., it is a design choice that can be made in advance).

The second challenge that a preferred embodiment of the present invention overcomes relates to the fact that in Equations 4 and 6, C is a nonlinear function of $\Omega_D$, the digital frequency, since C contains the trigonometric tangent function. Computing a tangent function requires an ability to compute fractions or decimals. Thus, it is not possible to apply Equation 6 directly using fixed-point math.

A preferred embodiment of the present invention, instead, uses polynomial interpolation to derive a value for each coefficient in Equation 6. There are a number of different techniques known in the art for deriving a polynomial interpolation of a function. One particular technique that is well-known in the art is known as Lagrange polynomial interpolation. In Lagrange polynomial interpolation, to approximate a function using an nth-degree polynomial, one first evaluates the original function, say f(x), at n+1 points $(x_0, x_1, \ldots, x_n)$ in order to obtain a series of data points, $f(x_0), f(x_1), \ldots, f(x_n)$. The nth-degree polynomial interpolation is given by $$p_n(x) = \sum_{i=0}^{n} l_i(x) f(x_i), \quad (7)$$

where the $l_i$'s are given by $$l_i(x) = \prod_{j \neq i, j=0}^{n} \left( \frac{x - x_j}{x_i - x_j} \right). \quad (8)$$

One of ordinary skill in the art will recognize that the expressions given above for Lagrange polynomial interpolation can be expanded symbolically so that the expanded form of $p_n$ can be determined by simply arithmetic evaluation in a computer. This, and other methods of polynomial interpolation, are well-known in the art as being readily performed by a computer. The interested reader may consult any suitable undergraduate textbook in numerical analysis for further details regarding polynomial interpolation and other function-approximation techniques.

In the context of a preferred embodiment of the present invention, a polynomial interpolation of each of each of the coefficient expressions in the filter's transfer function is made. Specifically, each of the coefficient expressions in the transfer function is expressed as a function of the notch frequency $\omega_0$, and an interpolating polynomial in $\omega_0$ is obtained.

For example, consider the expression given in Equation 6 for the coefficient of $z^2$ in the numerator of the transfer function. We will then treat this expression as a function f of the desired radian notch frequency $\omega$, as below:

$$f(w) = Q_1 Q_2 C^2 + Q_2 w + Q_1 Q_2 w^2 \quad (9)$$

If we make the a priori design decisions to match the digital and analog transfer functions at the same radian notch frequency, use a sampling frequency of 13.32 kHz, and to use quality factors of $Q_1 = Q_2 = 1$, we can substitute Equation 4 into Equation 9 to obtain $$f(\omega) = \left( \frac{\omega}{\tan(6660 \omega)} \right)^2 + \omega + \omega^2. \quad (10)$$

Using floating-point math, we can evaluate f($\omega$) at n+1 points to obtain $f(\omega_0), f(\omega_1), \ldots, f(\omega_n)$. In a preferred embodiment, n=2. To continue with the example, let us suppose that we evaluate Equation 10 at $\omega_0 = 2\pi \cdot 440$, $\omega_1 = 2\pi \cdot 880$, and $\omega_2 = 2\pi \cdot 1760$. We then obtain $f(\omega_0) \approx 7514402.33$, $f(\omega_1) \approx 30446290.00$, and $f(\omega_2) \approx 122168311.57$. Polynomial interpolation can then be performed on these values using either floating point math or by using fixed point math on rounded or truncated versions of the values. For example, Lagrange polynomial interpolation would proceed as below:

$$l_0(\omega) = \left( \frac{\omega - \omega_1}{\omega_0 - \omega_1} \right) \left( \frac{\omega - \omega_2}{\omega_0 - \omega_2} \right) \quad (11)$$
$$= \left( \frac{\omega - 2\pi \cdot 880}{2\pi \cdot 440 - 2\pi \cdot 880} \right) \left( \frac{\omega - 2\pi \cdot 1760}{2\pi \cdot 440 - 2\pi \cdot 1760} \right)$$

$$l_1(\omega) = \left( \frac{\omega - \omega_0}{\omega_1 - \omega_0} \right) \left( \frac{\omega - \omega_2}{\omega_1 - \omega_2} \right) \quad (12)$$
$$= \left( \frac{\omega - 2\pi \cdot 440}{2\pi \cdot 880 - 2\pi \cdot 440} \right) \left( \frac{\omega - 2\pi \cdot 1760}{2\pi \cdot 880 - 2\pi \cdot 1760} \right)$$

$$l_2(\omega) = \left( \frac{\omega - \omega_0}{\omega_2 - \omega_0} \right) \left( \frac{\omega - \omega_1}{\omega_2 - \omega_1} \right) \quad (13)$$
$$= \left( \frac{\omega - 2\pi \cdot 440}{2\pi \cdot 1760 - 2\pi \cdot 440} \right) \left( \frac{\omega - 2\pi \cdot 880}{2\pi \cdot 1760 - 2\pi \cdot 880} \right)$$

$$p(\omega) = \sum_{i=0}^{n} l_i(\omega) f(\omega_i) \quad (14)$$
$$= l_0(\omega) f(\omega_0) + l_1(\omega) f(\omega_1) + l_2(\omega) f(\omega_2) \quad (15)$$
$$\approx \omega^2 + 30437996 \omega - 84149059540. \quad (16)$$

Equation 16, above, shows that the interpolating polynomial p($\omega$) in our example can be evaluated using fixed-point math, since the only operations that are needed in order to evaluate p($\omega$) are addition, subtraction and multiplication over the integers. Moreover, even if it is necessary to scale the z-domain transfer function from which p($\omega$) is derived (i.e., by multiplying the numerator and denominator of the transfer function by a constant k), p($\omega$) can be easily scaled as well, simply by multiplying each term of p($\omega$) by k. Moreover, one of ordinary skill in the art will recognize that a scaled form of $\omega$, for example $\omega' = k \omega$ (k being the scale factor), may also be used by simply substituting $\omega'/k$ for $\omega$ in p($\omega$).

Thus, using the above-described techniques, each coefficient of a z-domain notch filter can be expressed as a polynomial over the integers that is a function of the desired radian notch frequency $\omega$. Hence, appropriate coefficients for a notch filter having a particular notch frequency may be calculated by a computer by supplying the notch frequency as input and evaluating the appropriate polynomial approximation for each coefficient in the z-domain transfer function of the filter. In a preferred embodiment, the interpolating polynomials for each coefficient are derived a priori using floating-point math, and the disc drive is programmed to evaluate these polynomials using fixed-point math.

Figure 4:
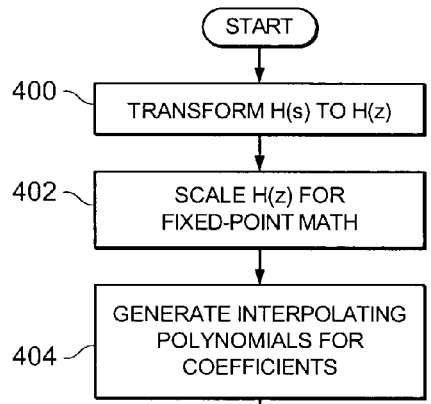
FIG. 4 is a flowchart representation of a process of deriving interpolating polynomials for notch filter coefficients in accordance with a preferred embodiment of the present invention.

FIG. 4 is a flowchart representation of a process of deriving interpolating polynomials for use in calculating notch filter coefficients in accordance with a preferred embodiment of the present invention. The bilinear transformation is used to take an s-domain transfer function and convert it into an equivalent z-domain transfer function (block 400). The z-domain transfer function so obtained is scaled so as to make the transfer function coefficients expressable as integers without significant loss of precision (block 402). Finally, polynomial interpolation is performed on each of the expressions defining the coefficients in the z-domain transfer function, so as to obtain interpolating polynomials that approximate the desired transfer function coefficients as functions of the filter's notch frequency (block 404).

Figure 5:
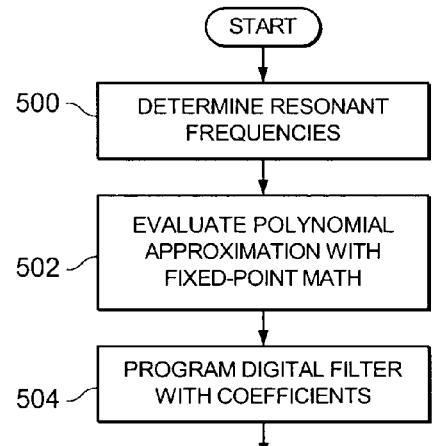
FIG. 5 is a flowchart representation of a process of deriving notch filter coefficients using fixed-point math in accordance with a preferred embodiment of the present invention.

FIG. 5 is a flowchart representation of a process of assigning appropriate notch filter coefficients to a disc drive control system notch filter in accordance with a preferred embodiment of the present invention. A resonant frequency of the disc drive control system is first determined (block 500); in the case of several resonant frequencies, each is determined and the subsequent steps are performed with respect to each frequency, so that a separate notch filter is derived for each notch frequency. Next, the approximating polynomials for each of the transfer function coefficients are evaluated at the resonant frequency (i.e., the desired notch frequency for the filter) (block 502). Finally, the results of evaluating the approximating polynomials are used as the filter coefficients to program the digital notch filter (block 504).

It is important to note that while the present invention has been described in the context of a fully functioning data processing system, those of ordinary skill in the art will appreciate that the processes of the present invention are capable of being distributed in the form of a computer readable medium of instructions or other functional descriptive material and in a variety of other forms and that the present invention is equally applicable regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system. Functional descriptive material is information that imparts functionality to a machine. Functional descriptive material includes, but is not limited to, computer programs, instructions, rules, facts, definitions of computable functions, objects, and data structures.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method comprising steps using fixed point arithmetic in evaluating a polynomial to calculate a set of coefficients for a notch filter and using the coefficients to program the notch filter to attenuate a resonant frequency of an apparatus.

2. The method of claim 1, wherein the polynomial is a polynomial interpolation of a non-linear function.

3. The method of claim 2, wherein the non-linear function is derived from a transformation of a notch filter transfer function from the s-domain to the z-domain.

4. The method of claim 3, wherein the non-linear function is derived from a bilinear transformation of the notch filter transfer function from the s-domain to the z-domain.

5. The method of claim 1 wherein the apparatus is characterized by a servo system.

6. A method comprising steps using fixed point arithmetic in evaluating an interpolating function that approximates an original function to calculate a set of coefficients for a notch filter and using the coefficients to program the notch filter to attenuate a resonant frequency of an apparatus.

7. The method of claim 6, wherein the original function is derived from a z-domain notch filter transfer function.

8. The method of claim 7, wherein the z-domain notch filter transfer function is obtained by transformation of an z-domain notch filter transfer function.

9. The method of claim 8, wherein the z-domain notch filter transfer function is obtained by bilinear transformation of the s-domain notch filter transfer function.

10. The method of claim 6 wherein the apparatus is characterized by a servo system.

11. An apparatus comprising control circuitry capable of using fixed point arithmetic in evaluating a polynomial to calculate a set of coefficients for a notch filter and using the coefficients to program the notch filter to attenuate a resonant frequency of the apparatus.

12. The apparatus of claim 11, wherein the polynomial is a polynomial interpolation of a non-linear function.

13. The apparatus of claim 12, wherein the non-linear function is derived from a transformation of a notch filter transfer function from the s-domain to the z-domain.

14. The apparatus of claim 13, wherein the non-linear function is derived from a bilinear transformation of the notch filter transfer function from the s-domain to the z-domain.

15. The apparatus of claim 14 wherein the control circuitry comprises a processor capable of executing a set of written instructions to calculate the set of coefficients.

16. The apparatus of claim 15 wherein the control circuitry comprises a memory to which the processor is capable of storing the set of coefficients.

17. The apparatus of claim 15 wherein the processor is capable of programming the notch filter in accordance with the set of coefficients.

18. The apparatus of claim 11 wherein the resonant frequency is characterized as being from a servo system.

19. An apparatus comprising control circuitry capable of using fixed point arithmetic in evaluating an interpolating function that approximates an original function to calculate a set of coefficients for a notch filter and using the coefficients to program the notch filter to attenuate a resonant frequency of the apparatus.

20. The apparatus of claim 19, wherein the original function is derived from a z-domain notch filter transfer function.

21. The apparatus of claim 20, wherein the z-domain notch filter transfer function is obtained by transformation of an z-domain notch filter transfer function.

22. The apparatus of claim 21, wherein the z-dormain notch filter transfer function is obtained by bilinear transformation of an s-domain notch filter transfer function.

23. The apparatus of claim 22 wherein the control circuitry comprises a processor capable of executing a set of written instructions to calculate the set of coefficients.

24. The apparatus of claim 23 wherein the control circuitry comprises a memory to which the processor is capable of storing the set of coefficients.

25. The apparatus of claim 23 wherein the processor is capable of programming the notch filter in accordance with the set of coefficients.

26. The apparatus of claim 19 wherein the resonant frequency is characterized as being from a servo system.

* * * * *